(12) United States Patent
Fukuda et al.

(10) Patent No.: US 9,798,470 B2
(45) Date of Patent: Oct. 24, 2017

(54) MEMORY SYSTEM FOR STORING AND PROCESSING TRANSLATION INFORMATION

(71) Applicant: Toshiba Memory Corporation, Minato-ku, Tokyo (JP)

(72) Inventors: Tohru Fukuda, Nishitokyo Tokyo (JP); Shinichiro Nakazumi, Kawasaki Kanagawa (JP); Yoshihisa Kojima, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 14/850,387

(22) Filed: Sep. 10, 2015

(65) Prior Publication Data
US 2016/0216887 A1   Jul. 28, 2016

Related U.S. Application Data

(60) Provisional application No. 62/107,022, filed on Jan. 23, 2015.

(51) Int. Cl.
*G06F 3/06* (2006.01)
*G06F 12/02* (2006.01)

(52) U.S. Cl.
CPC ............ *G06F 3/061* (2013.01); *G06F 3/0655* (2013.01); *G06F 3/0685* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,832,357 B2 | 9/2014 | Yao et al. | |
| 9,330,752 B2 * | 5/2016 | Yonezawa | G11C 11/5628 |
| 2005/0144418 A1 * | 6/2005 | Kita | G06F 12/0246 |
| | | | 711/203 |
| 2006/0053246 A1 * | 3/2006 | Lee | G06F 9/4403 |
| | | | 711/100 |
| 2008/0177937 A1 * | 7/2008 | Nishihara | G06F 12/0246 |
| | | | 711/103 |
| 2012/0002315 A1 * | 1/2012 | Inoue | G11B 5/09 |
| | | | 360/31 |

(Continued)

FOREIGN PATENT DOCUMENTS

| | | |
|---|---|---|
| JP | 2012-068986 A | 4/2012 |
| JP | 2012-079403 A | 4/2012 |
| JP | 2012-181909 A | 9/2012 |

*Primary Examiner* — Kevin Verbrugge
(74) *Attorney, Agent, or Firm* — David M. Tennant

(57) ABSTRACT

According to one embodiment, a memory system includes a non-volatile first memory, a second memory, and a memory controller. The memory controller is configured to store a plurality of translation information in the first memory and perform a first process in a case of starting. The translation information indicates a relation between a first address designated from the outside and a second address indicating a location in the first memory. The first process is a process in which the memory controller acquires the plurality of translation information from the first memory in an order of a storage location of the translation information in the first memory, and stores the plurality of acquired translation information in the second memory.

21 Claims, 15 Drawing Sheets

(56) References Cited

U.S. PATENT DOCUMENTS

| | | |
|---|---|---|
| 2012/0084490 A1 | 4/2012 | Choi et al. |
| 2012/0159058 A1* | 6/2012 | Yonezawa .......... G11C 11/5628 711/104 |
| 2012/0221775 A1 | 8/2012 | Kim et al. |
| 2012/0278664 A1* | 11/2012 | Kazui ................ G06F 12/0246 714/48 |
| 2013/0227246 A1* | 8/2013 | Hirao ................. G06F 12/0246 711/206 |
| 2013/0246689 A1* | 9/2013 | Matsudaira ........ G06F 12/0246 711/103 |
| 2014/0365711 A1* | 12/2014 | Makida .............. G06F 12/0246 711/103 |
| 2015/0169465 A1* | 6/2015 | Slepon ............... G06F 12/1009 711/103 |

\* cited by examiner

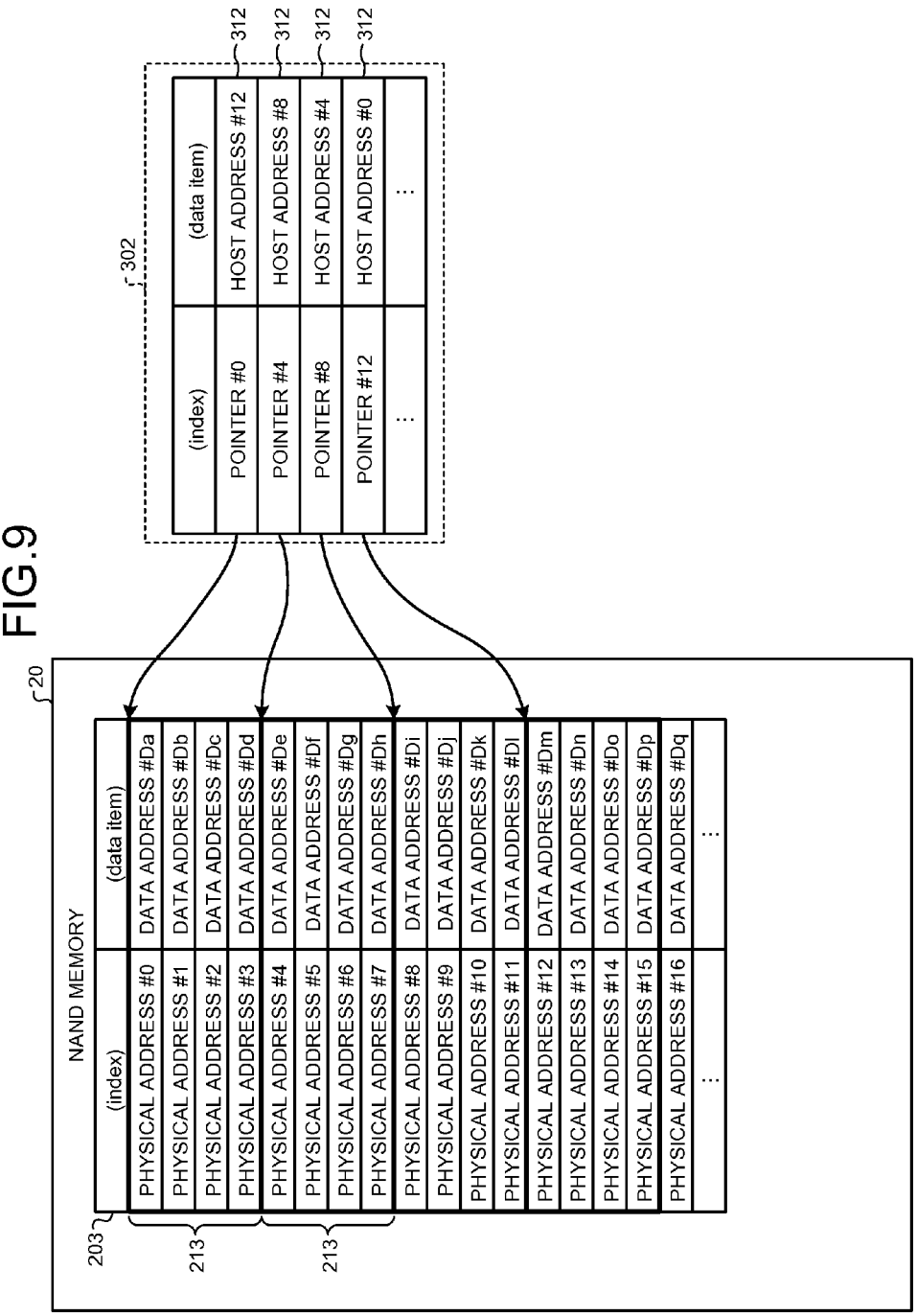

FIG.10

| (index) | (data item) |
|---|---|
| HOST ADDRESS #0 | DATA ADDRESS #Dm |
| HOST ADDRESS #1 | DATA ADDRESS #Dn |
| HOST ADDRESS #2 | DATA ADDRESS #Do |
| HOST ADDRESS #3 | DATA ADDRESS #Dp |
| HOST ADDRESS #4 | - |
| HOST ADDRESS #5 | - |
| HOST ADDRESS #6 | - |
| HOST ADDRESS #7 | - |
| HOST ADDRESS #8 | DATA ADDRESS #De |
| HOST ADDRESS #9 | DATA ADDRESS #Df |
| HOST ADDRESS #10 | DATA ADDRESS #Dg |
| HOST ADDRESS #11 | DATA ADDRESS #Dh |
| HOST ADDRESS #12 | - |
| HOST ADDRESS #13 | - |
| HOST ADDRESS #14 | - |
| HOST ADDRESS #15 | - |
| HOST ADDRESS #16 | - |
| ⋮ | ⋮ |

| (index) | (data item) |
|---|---|
| HOST ADDRESS #0 | Cached |
| HOST ADDRESS #4 | Not Cached |
| HOST ADDRESS #8 | Cached |
| HOST ADDRESS #12 | Not Cached |
| ⋮ | ⋮ |

305

MEMORY SYSTEM FOR STORING AND PROCESSING TRANSLATION INFORMATION

CROSS-REFERENCE TO RELATED APPLICATIONS

This application is based upon and claims the benefit of priority from U.S. Provisional Application No. 62/107,022, filed on Jan. 23, 2015; the entire contents of which are incorporated herein by reference.

FIELD

Embodiments described herein relate generally to a memory system.

BACKGROUND

Conventionally, as a memory system, an SSD (Solid State Drive) provided with a NAND flash memory (hereinafter, referred to as a "NAND memory") is known. In the NAND memory, a unit of reading and writing is smaller than a unit of erasing. Before the writing, the erasing needs to be operated. According to this characteristic of the NAND memory, the SSD associates a logical address designated as a location where a host performs a read operation with a physical address indicating a physical location of the NAND memory. The SSD stores therein a relation between the logical address and the physical address as translation information. The SSD loads the translation information from the NAND memory to a RAM, and performs updating or referring to the translation information on the RAM.

BRIEF DESCRIPTION OF THE DRAWINGS

FIG. 9 is a diagram illustrating an exemplary data structure of a reverse-lookup first table;

FIG. 10 is a diagram illustrating an exemplary data structure of a second table cache;

DETAILED DESCRIPTION

In general, according to one embodiment, a memory system includes a non-volatile first memory, a second memory, and a memory controller. The memory controller is configured to store a plurality of translation information in the first memory and perform a first process in a case of starting. The translation information indicates a relation between a first address designated from the outside and a second address indicating a location in the first memory. The first process is a process in which the memory controller acquires the plurality of translation information from the first memory in an order of a storage location of the translation information in the first memory, and stores the plurality of acquired translation information in the second memory.

The memory system according to embodiments will be described in detail with reference to the accompanying drawings below. Further, the invention is not limited to these embodiments.

First Embodiment

Figure 1:
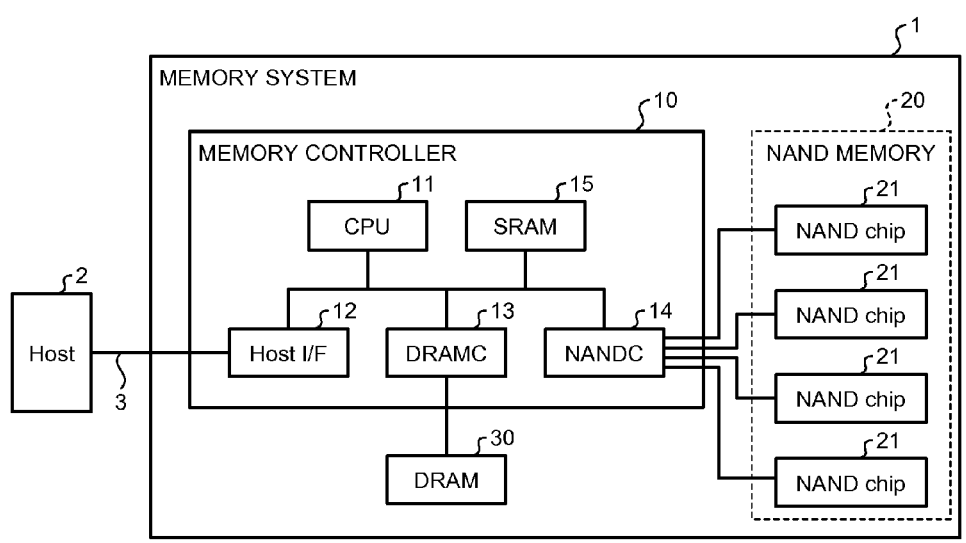
FIG. 1 is a diagram illustrating an exemplary configuration of a memory system of an embodiment.

FIG. 1 is a diagram illustrating an exemplary configuration of the memory system of an embodiment. A memory system 1 is connected to a host 2 via a communication channel 3. The host 2, for example, is a computer. The computer includes a personal computer, a portable computer, a portable communication device, or the like. The memory system 1 serves as an external storage device of the host 2. Any standard can be employed as the interface standard of the communication channel 3. The host 2 can issue an access request (a write request and a read request) to the memory system 1. The access request includes a logical address which designates a location of an access destination. Any external apparatus instead of the host 2 may request the access to the memory system 1 using the logical address. The description herein will be made about a case where the logical address is used by the host 2. Hereinafter, the logical address is denoted as a host address. The host address is assigned to every predetermined unit area. For example, the host address is assigned in a unit of sector.

The memory system 1 includes a memory controller 10, a NAND flash memory (a NAND memory) 20 used as a storage, and a DRAM (Dynamic Random Access Memory) 30. Further, the type of memory used as the storage is not limited only to the NAND flash memory. For example, a NOR flash memory, a ReRAM (Resistance Random Access Memory), a MRAM (Magnetoresistive Random Access Memory), or the like can also be employed. The DRAM 30 may be built in the memory controller 10.

The memory controller 10 receives the access request from the host 2. Then, the memory controller 10 performs data transmission between the host 2 and the NAND memory 20 in response to the received access request.

The NAND memory 20 is composed of one or more memory chips (CHIP) 21. In this example, the NAND memory 20 includes four memory chips 21. Each of four memory chips 21 is connected to the memory controller through one of four channels. In this example, each of four memory chips 21 is connected to a channel different from each other. Each channel is composed of a wiring group which includes an I/O signal line and a control signal line. The I/O signal line is a signal line through which data, an address, and a command are transmitted and received. Further, a bit width of the I/O signal line is not limited to one. The control signal line is a signal line for transmitting and receiving a WE (write enable) signal, a RE (read enable) signal, a CLE (command latch enable) signal, an ALE (address latch enable) signal, a WP (write protect) signal, a Ry/By (ready/busy) signal, and the like. The memory controller 10 can individually control the respective channels.

Figure 2:
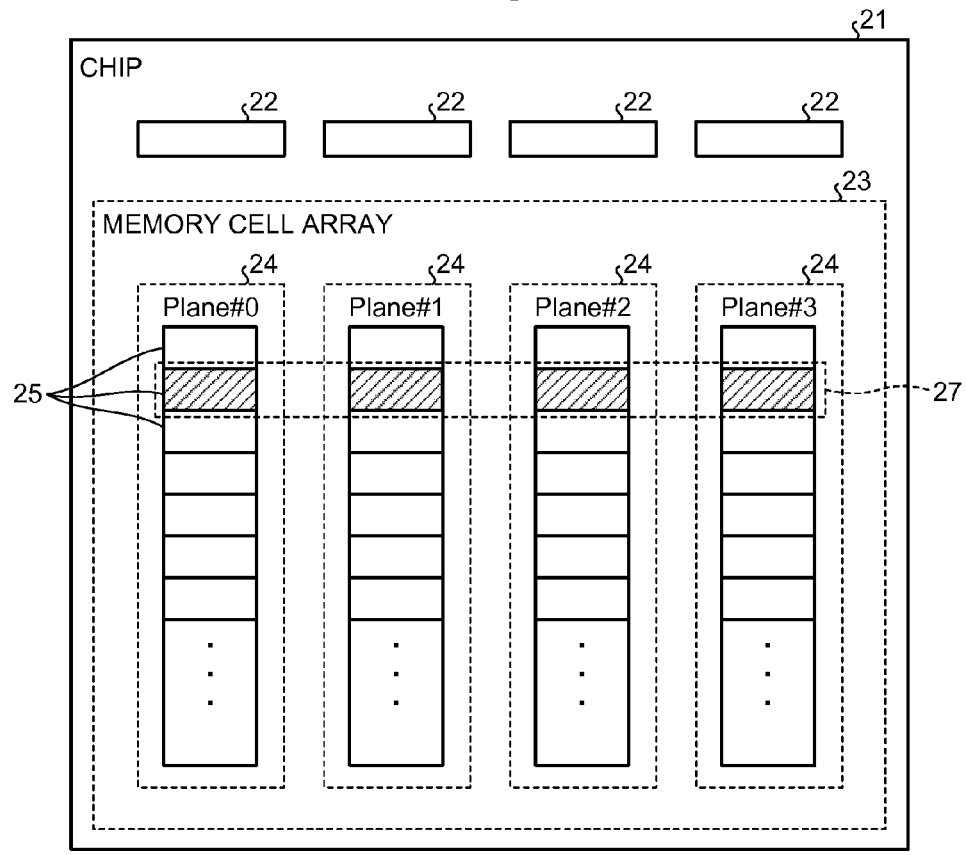
FIG. 2 is a diagram illustrating an exemplary configuration of each memory chip.

FIG. 2 is a diagram illustrating an exemplary configuration of each memory chip 21. Each memory chip 21 includes a memory cell array 23. The memory cell array 23 is composed of a plurality of memory cells which are located in a matrix shape. The memory cell array 23 is divided into a plurality of areas (planes) 24. Herein, as an example, the memory cell array 23 is divided into four planes 24. Each plane 24 includes a plurality of physical blocks 25. Each plane 24 includes peripheral circuits (for example, a row decoder, a column decoder, and the like) which are independently of each other, so that each memory chip 21 can perform an erase/program/read operation on a plurality of planes 24 at the same time. Four planes 24 in each memory chip 21 are specified using plane numbers (Plane #0 to Plane #3).

Figure 3:
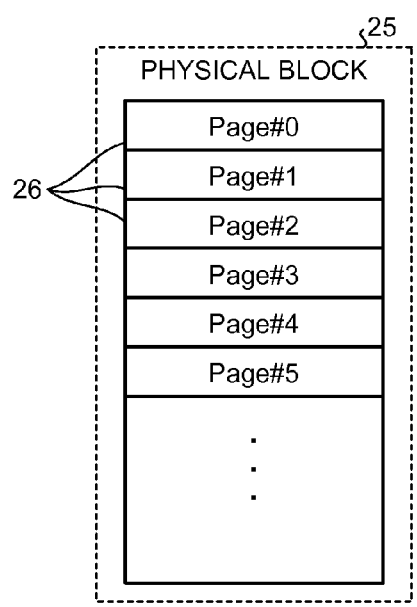
FIG. 3 is a diagram illustrating an exemplary configuration of each physical block.

The physical block 25 is a unit of erasing in each plane 24. FIG. 3 is a diagram illustrating an exemplary configuration of each physical block 25. Each physical block 25 is configured to include a plurality of physical pages 26. Herein, as an example, the physical pages 26 are distinguished from each other by giving page numbers (Page #0 and so on) thereto in an ascending order from the head of the physical block 25. Hereinafter, the physical page 26 is simply denoted as a page 26.

In each memory chip 21, four physical blocks 25 each belonging to different planes 24 are simultaneously accessed. The simultaneously accessed four physical blocks 25 are denoted as a block group. Each memory chip 21 includes a plurality of block groups 27. Four physical blocks 25 included in the same block group 27 may be erased in parallel at the same timing. The program or read operation may be performed on four pages 26 each belonging to four physical blocks 25 included in the same block group 27 in parallel at the same timing.

Further, the page numbers of four pages 26 on which the program or read operation is performed at the same timing may be the same number between four physical blocks 25 included in the same block group 27 or may be different. Herein, as an example, the program or read operation is performed on four pages 26 of the same page number in four physical blocks 25 included in the same block group 27 at the same timing.

In addition, a combination of four physical blocks 25 included in each block group 27 is statically or dynamically set. In the example of FIG. 2, hatched four physical blocks 25 are included in one block group 27 for example.

In addition, each block group 27 may be composed of a plurality of physical blocks 25 which can be accessed in parallel. According to the exemplary configuration illustrated in FIG. 1, the memory controller 10 can access to four memory chips 21 in parallel. For example, each block group 27 may be composed of 16 physical blocks 25 different in at least one of the channel where the provided memory chip 21 is connected and the plane number where the physical blocks belong. In addition, in a case where the memory system 1 is configured to perform a bank interleave operation, each block group 27 may be composed of the plurality of physical blocks 25 different in at least one of the channel where the provided memory chip 21 is connected, a bank number of the provided memory chip 21, and the plane number where the physical blocks belong.

A method of performing the read operation in parallel on a plurality of pages 26 of the same block group 27 will be denoted as a "multi-plane read operation".

Each memory chip 21 includes four page buffers 22 each corresponding to each plane 24. Each page buffer 22 has the same size as that of at least one page 26. Each page buffer 22 is composed of a register or a small-sized memory. Each page buffer 22, for example, is composed of an SRAM (Static Random Access Memory). Each page buffer 22 serves as a buffer for the transmission between the memory controller 10 and each plane 24. Hereinafter, data having a size of one page 26 may be denoted as page data.

Figure 4:
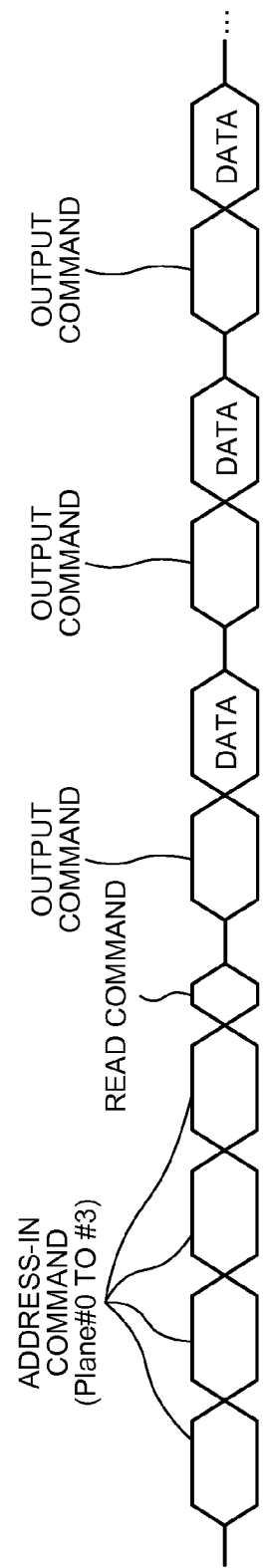
FIG. 4 is a diagram illustrating an example of a command sequence for a multi-plane read operation.

The memory controller 10 can command each memory chip 21 to perform the multi-plane read operation. FIG. 4 is a diagram illustrating an example of a command sequence for the multi-plane read operation. In a case where the multi-plane read operation is performed, the memory controller 10 first continuously transmits address-in commands for the respective planes 24 to the target memory chip 21. The address-in command includes a physical address which specifies the page 26 of the read source. The physical address is information which statically and uniquely indicates a location in the storage area of the NAND memory 20. As a format of the physical address, any format can be employed as long as the location (memory cell) in the NAND memory 20 is statically and uniquely indicated at least. "Statically" means "not vary with time". After all the address-in commands are transmitted, the memory controller 10 transmits a read command to the target memory chip 21. In response to the read command, the target memory chip 21 reads the page data from the page 26 indicated by the designated physical address of each plane 24 out to the corresponding page buffer 22. The memory controller 10 detects whether the page data is read out to all the page buffers 22, for example, by monitoring the Ry/By signal. The Ry/By signal is a signal indicating a By state in a period when the target memory chip 21 is performing an internal process including access to the memory cell array 23, and indicating a Ry state in a period when the target memory chip 21 is not performing the internal process. After the page data is stored in all the page buffers 22, the memory controller 10 transmits an output command to the target memory chip 21. The output command, for example, includes the physical address indicating a read start location in four page data read out to four page buffers 22. The target memory chip 21 outputs data having a predetermined size or a designated size from the location designated by the output command in any one of the page buffers 22 to the memory controller 10 in response to receiving the output command. The predetermined size, for example, is equal to a cluster size. In addition, the memory controller 10 may designate the size of the read target data by the output command. In addition, the memory controller 10 may control the size of the data output to the target memory chip 21 by controlling the number of times of toggling in the RE signal. The memory controller 10 can transmit the output command plural times. The memory controller 10, for example, transmits the output command in a unit of cluster plural times in order to output four page data in a unit of cluster. By using the multi-plane read operation, the read operation of the page data from the memory cell array 23 to one page buffer 22 can be simultaneously performed on the plurality of planes 24. Therefore, the transfer rate of the data from the NAND memory 20 to the memory controller 10 is improved compared to the case where the read operation is sequentially performed on each plane 24.

Figure 5:
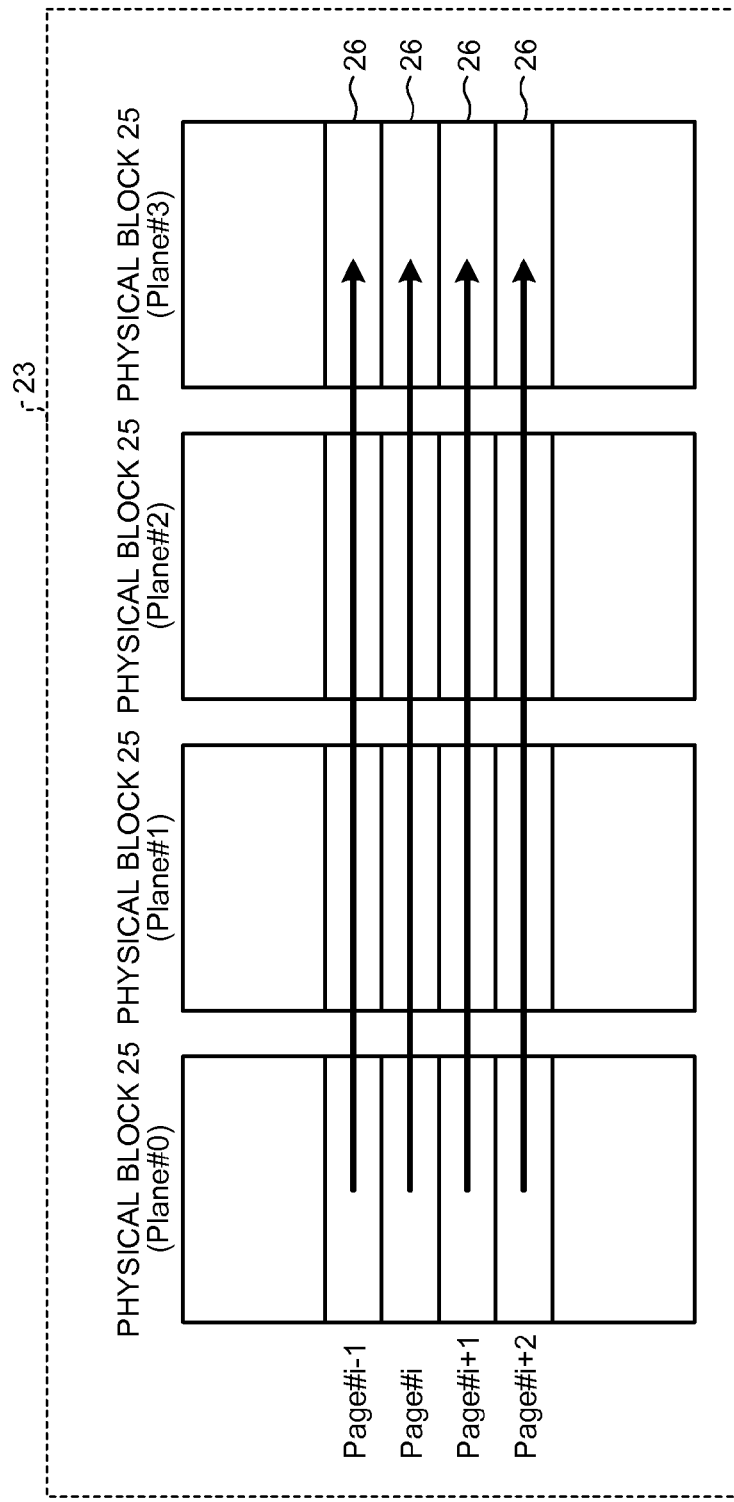
FIG. 5 is a diagram for describing a scheme of assigning a physical address.

FIG. 5 is a diagram for describing a scheme of assigning the physical address. According to the embodiment, the respective physical addresses are assigned to the respective pages 26 such that a plurality of consecutive physical addresses are distributed into the plurality of planes 24 in the same memory chip 21. For example, the respective physical addresses are assigned to the respective pages 26 such that the respective physical addresses are consecutive in an ascending order in a sequence depicted by arrows of FIG. 5. For example, in four physical blocks 25 included in each block group 27, the physical address assigned to the head on Page #i of Plane #1 follows the physical address assigned to the end on Page #i of Plane #0. The physical address assigned to the head on Page #i of Plane #2 follows the physical address assigned to the end on Page #i of Plane #1. The physical address assigned to the head on Page #3 of Plane #1 follows the physical address assigned to the end on Page #2 of Plane #0. Since each physical address is assigned to each page 26 as described above, the memory controller 10 can collectively read the respective page data from the plurality of pages 26 out to the respective page buffers 22 through one multi-plane read operation.

Further, the head on Page #i of Plane #0 may be assigned with a physical address followed by the physical address assigned to the end on Page #i of Plane #3 provided in another memory chip 21 or another block group 27. The head on Page #i of Plane #0 may be assigned with a physical address followed by the physical address assigned to the end on Page #i−1 of Plane #3 in the same block group 27.

The DRAM 30 serves as a memory in which various types of information are temporarily stored by a CPU 11. Various types of information stored in the DRAM 30 will be described in detail below. Further, any type of memory operated at a higher speed than the NAND memory 20 can be applied instead of the DRAM 30. Any type of volatile memory can be applied instead of the DRAM 30.

At the time when the memory system 1 operates, various types of information are stored in the DRAM 30, and appropriately referred or updated on the DRAM 30. However, since the DRAM 30 is a volatile memory, various types of information are not available in a power-off state. Therefore, a part of information which is required again after the power-on among various types of information stored in the DRAM 30 is saved in the NAND memory 20 in a power-off sequence. The information saved in the NAND memory 20 is restored to the DRAM 30 in a power-on sequence. In addition, another part of information among the information stored in the DRAM 30 may be rebuilt based on any other information in the power-on sequence. In the first embodiment, a first table 301 and a reverse-lookup first table 301 both are assumed to be saved in the power-off sequence. Both lookup and reverse-lookup mean concept of direction of acquiring an address. Herein, lookup means direction from a host address to a physical address. Reverse-lookup means direction from a physical address to a host address.

Herein, simply moving the entire data structure at one time or little by little is denoted as restoration. Newly creating a lost data structure is denoted as rebuilding. Loading includes the restoration and the rebuilding. In the concept of the loading, all the operations of generating data based on other information are included.

Figure 6:
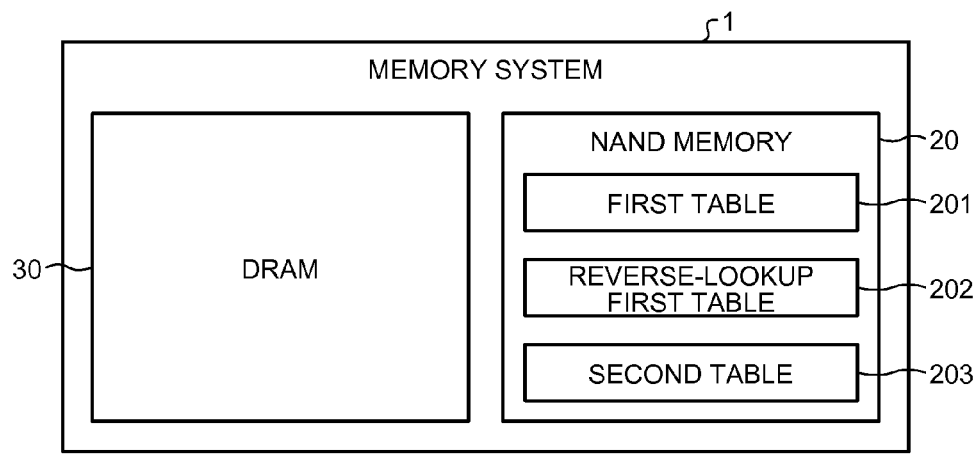
FIG. 6 is a diagram for describing various types of information stored in a NAND memory and a DRAM.
Figure 7:
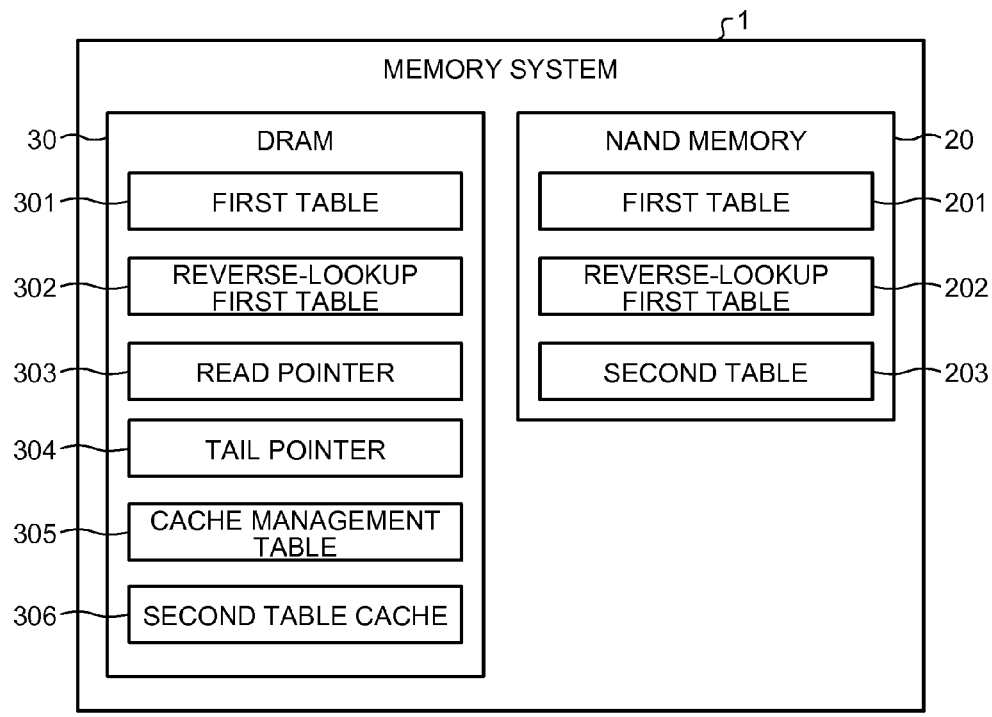
FIG. 7 is a diagram for describing various types of information stored in the NAND memory and the DRAM.

FIGS. 6 and 7 are diagrams for describing various types of information stored in the NAND memory 20 and the DRAM 30. FIG. 6 illustrates various types of information stored in various types of memories after the power-off. FIG. 7 illustrates various types of information stored in various types of memories after the power-on.

As illustrated in FIG. 6, in the power-off state, the memory system 1 holds a first table 201, a reverse-lookup first table 202, and a second table 203 in the NAND memory 20. In the power-off state, the memory system 1 holds no information in the DRAM 30.

In addition, as illustrated in FIG. 7, in a power-on state, the memory system 1 holds the first table 301, the reverse-lookup first table 302, a cache management table 305, and the second table cache 306 in the DRAM 30. In addition, the memory system 1 holds a read pointer 303 and a tail pointer 304 in the DRAM 30.

Herein, a writing method onto the NAND memory 20 will be described. The memory controller 10 performs an erase operation on the NAND memory 20 in a unit of the block group 27. Therefore, in a case where first data is stored in the NAND memory 20 and in this state the host 2 designates the same host address as the first data to send second data, the memory controller 10 writes the second data in the block group 27 having an empty page 26 and manages the first data as invalid data. Herein, the "empty" state means a state in which programming is not operated after erasing is operated. The expression "data is valid" means that the data is up to date. In a case where a plurality of data designated with the same host address are stored in the NAND memory 20, the updated state means a state of the data finally written by the host 2 among the plurality of data. The invalid data means data other than the data finally written by the host 2 among the plurality of data.

Through the writing method described above, the memory controller 10 stores, as translation information, a relation between the host address and the physical address indicating a location where the data from the host 2 is stored. The physical address indicating a location where the data from the host 2 is stored is denoted as a data address. Further, a relation between the host address and the data address can be recorded in any type of format as long as the data address is detectable at least from the host address. The relation between the host address and the data address may be not necessary for containing both the host address and the data address. For example, any one of the host address and the data address in the relation may be associated with a recording location of the relation so as to be derivable from the recording location of the relation. In addition, any one of the host address and the data address in the relation, for example, may be described as another data (such as a pointer) associated through the storage location information.

Herein, as an example, the memory controller 10 manages the translation information in two stages. The first tables 201 and 301 correspond to a first stage among the two stages. In addition, the second table 203 corresponds to a second stage among the two stages. The second table cache 306 is a cache of the second table 203.

The reverse-lookup first tables 202 and 302 are tables used for reversely looking up the content managed by the first tables 201 and 301.

In the power-on state, the memory controller 10 refers or updates the first table 301 and the reverse-lookup first table 302. In the power-off sequence, the memory controller 10 saves the first table 301 from the DRAM 30 to the NAND memory 20 as the first table 201, and saves the reverse-lookup first table 302 from the DRAM 30 to the NAND memory 20 as the reverse-lookup first table 202. In addition, in the power-on sequence, the memory controller 10 restores the first table 201 from the NAND memory 20 to the DRAM 30 as the first table 301, and restores the reverse-lookup first table 202 from the NAND memory 20 to the DRAM 30 as the reverse-lookup first table 302.

In addition, in the power-on sequence, the memory controller 10 restores the second table cache 306 based on the reverse-lookup first table 302 and the second table 203. Further, a process of restoring the second table cache 306 as a part of the power-on sequence is denoted as background restoration. The read pointer 303 and the tail pointer 304 are pointers used in the background restoration of the second table cache 306. The details of the read pointer 303 and the tail pointer 304 will be described below. Further, as the process of restoring the second table cache 306, there is on-demand restoration which is a process of restoring the second table cache 306 in response to a translation request issued during the operation besides the background restoration. The translation request is internally issued by the memory controller 10 in response to the access request (for example, the read request and the write request) from the host 2. Furthermore, the translation request is also internally issued by the memory controller 10 as a part of a garbage collection.

The garbage collection means a process in which the valid data from one block (the physical block 25 or the block group 27) is moved (copied) to another block, and then regards all the data stored in the block of a move source as the invalid data. The memory controller 10 performs the erase operation on the block of the move source after the garbage collection, and starts the write operation of the data again on the block after the data is erased. The translation request is issued at the time of the determination on whether the data stored in the block of the move source is valid. Specifically, the memory controller 10 stores the designated host address in association with the writing target data when the data from the host 2 is written in the NAND memory 20. Then, in the process of determining whether the data written in the NAND memory 20 is valid, the memory controller 10 issues the translation request for translating the host address corresponding to the determination target data into the data address. Then, the memory controller 10 refers a write location of the determination target data and the data address acquired in response to the translation request. In a case where the location and the data address are matched, the memory controller 10 determines that the determination target data is valid. In a case where the location and the data address are not matched, the memory controller 10 determines that the determination target data is invalid.

The respective tables will be specifically described. In the following description, the first table 301 will be described as a representative of the first tables 201 and 301. In addition, the reverse-lookup first table 302 will be described as a representative of the reverse-lookup first tables 202 and 302.

Figure 8:
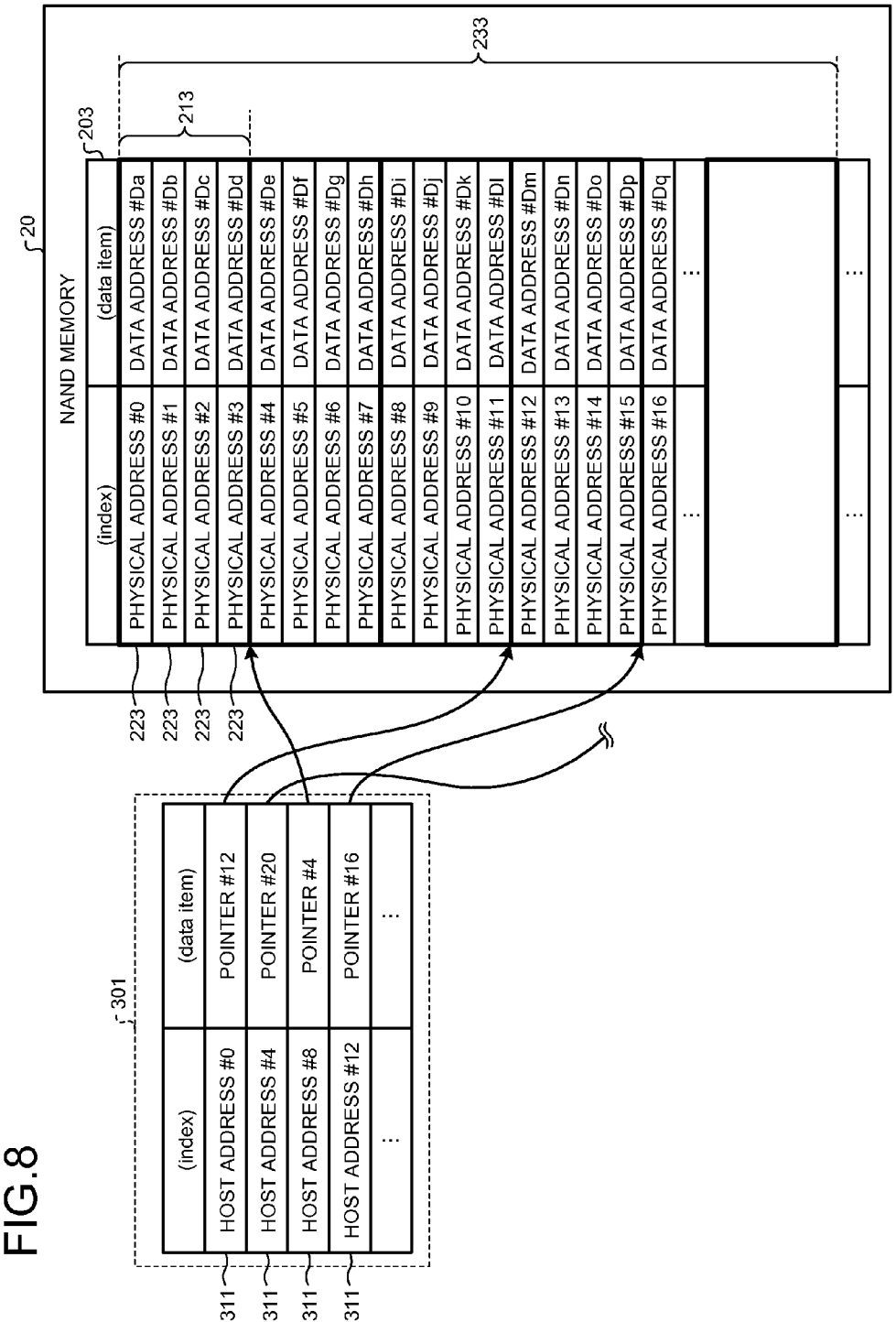
FIG. 8 is a diagram illustrating an exemplary data structure of a first table and a second table.

FIG. 8 is a diagram illustrating an exemplary data structure of the first table 301 and the second table 203. The first table 301 is recorded with a record (a first record 311) by a first unit. The second table 203 is recorded with a record group (a second record group 213) by the first unit. Herein, the first unit is denoted as a region. The region is an area having a size of the first unit on a host address space. Each second record group 213 includes a plurality of second records 223. Each second record 223 is recorded with the data address by a second unit. The size of the second unit is smaller than that of the first unit. The size of the second unit may be equal to the size of a minimum unit for assigning the host address, or may be larger than the size of the minimum unit for assigning the host address. Herein, the second unit is referred to as a cluster. Further, in the example of FIG. 8, one region is assumed to have a size corresponding to four clusters.

Each first record 311 includes a pointer which points the second record group 213 as a data item. Further, each first record 311 may include any information other than the pointer as the data item as long as the information indicates a storage location of the second record group 213. For example, each first record 311 may include an offset from a predetermined location as the data item. Each first record 311 is retrieved using the host address as an index. That is, each first record 311 associates the host address (hereinafter, referred to as a region number) and the pointer for each region. The pointer is denoted as a physical address. Each second record 223 is retrieved using the physical address of a storage location of each second record 223. A plurality of second records 223 included in each second record group 213 each correspond to a plurality of clusters included in the corresponding region. In each second record group 213, the plurality of second records 223 are arranged in an order of the host address. That is, the host address of the n-th cluster from the head of Region #m is associated with the data address recorded in the n-th second record 223 from the head in the second record group 213 which is associated with Region #m in the first table 301.

Herein, through one multi-plane read operation, the memory controller 10 can collectively read the plurality of second record groups 213 in which the physical addresses of the storage locations of each second record group 213 are consecutive. For example, the plurality of second record groups 213 included in a collective read unit 233 of FIG. 8 are read through one multi-plane read operation. The number of second record groups 213 included in the collective read unit 233 is denoted as "N". The number "N" is an integer of 2 or more. The number of second record groups 213 which are collectively read is denoted as the read unit size. That is, the read unit size is "N".

FIG. 9 is a diagram illustrating an exemplary data structure of the reverse-lookup first table 302. Each record (a reverse-lookup first record 312) included in the reverse-lookup first table 302 includes a pointer which points the second record group 213 as an index, and includes the host address in a unit of region as a data item. Therefore, an order of the index of each reverse-lookup first record 312 is matched with an order of the physical address indicating the storage location of each second record group 213 pointed by each reverse-lookup first record 312.

FIG. 10 is a diagram illustrating an exemplary data structure of the second table cache 306. In the second table cache 306, the second record group 213 is cached. The second record group cached in the second table cache 306 is denoted as the second record group 316. In addition, each second record included in a second record group 316 is denoted as the second record 326. In the second table cache 306, the second record group 316 is cached in an order of the host address. That is, the second table cache 306 is retrieved using the host address as the index. Further, the recording of the second record group 316 in the second table cache 306 may be simply denoted as the caching of the region.

The memory controller 10 updates the relation between the host address and the data address on the second table cache 306. For example, upon writing data to the NAND memory 20 in response to the write request or upon writing data to the NAND memory 20 in the garbage collection, the memory controller 10 updates the relation. By the updating, the contents of the second record group 316 in the second table cache 306 and the second record group 213 of a cache source (corresponding to the same region number) in the NAND memory 20 becomes different from each other. A state where the contents of the second record group 316 in the second table cache 306 and the second record group 213 of the cache source in the NAND memory 20 are not matched with each other is denoted as "dirty". The memory controller 10 manages the second record group 316 of which the content is not matched with the second record group 213 of the cache source as a dirty record. The memory controller 10 adds the dirty record to the end of the second table 203 as a new second record group 213 at a predetermined timing. In response to the adding of the new second record group 213, the memory controller 10 performs the updating of the first table 301 and the adding of the new reverse-lookup first record 312 to the reverse-lookup first table 302.

Figures 11, 12:
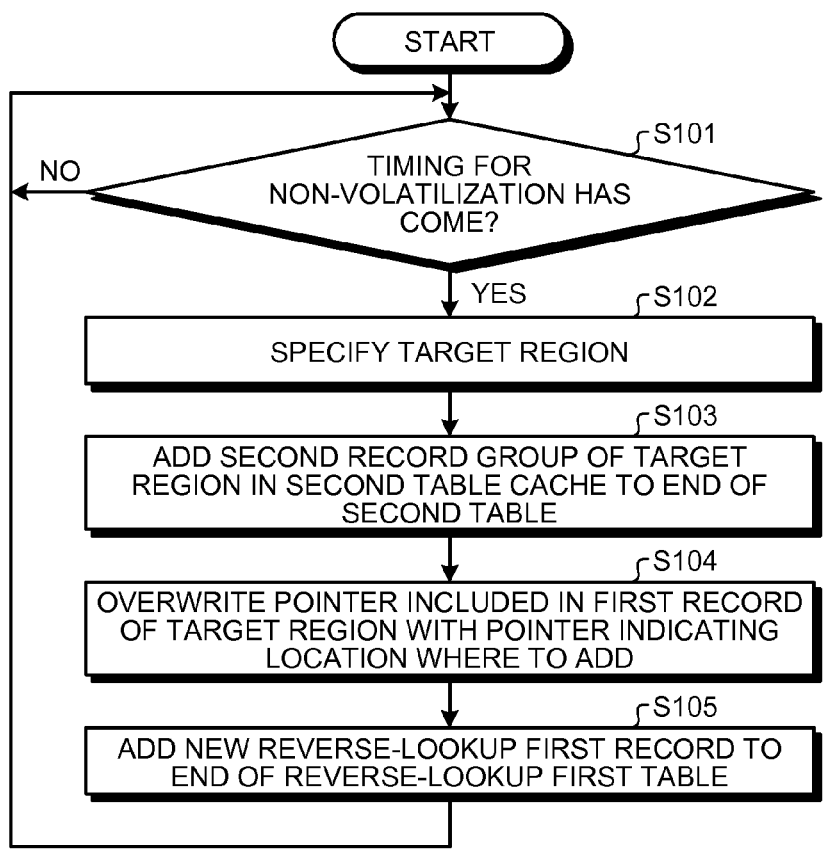
FIG. 11 is a diagram illustrating an exemplary data structure of a cache management table.
FIG. 12 is a flowchart for describing a non-volatilization operation of a dirty record.

FIG. 11 is a diagram illustrating an exemplary data structure of the cache management table 305. The cache management table 305 is information used to manage whether the second record group 213 is cached in the second table cache 306 as the second record group 316 for each region. The cache management table 305 is retrieved using the region number as an index. According to the example of FIG. 11, "Cached" indicating that the second record group 213 is cached or "Not Cached" indicating that the second record group 213 is not cached are recorded in the cache management table 305 for each region. Further, in a case where the second record group 213 is cached, the cache management table 305 may include an address indicating a location on the DRAM 30 at which the second record group 213 is cached.

The memory controller 10 includes a CPU (Central Processing Unit) 11, a host interface (host I/F) 12, a DRAM controller (DRAMC) 13, a NAND controller (NANDC) 14, and an SRAM (Static Random Access Memory) 15. The CPU 11, the host I/F 12, the DRAMC 13, the NANDC 14, and the SRAM 15 are connected to each other through a bus.

The host I/F 12 performs control on the communication channel 3. In addition, the host I/F 12 receives the access request from the host 2. In addition, the host I/F 12 performs data transmission between the host 2 and the DRAM 30. The DRAMC 13 is a controller used for the memory controller 10 to have access to the DRAM 30. The CPU 11 serves as a processing unit which performs control on the entire memory controller 10 by executing a firmware program. The SRAM 15 is used as a buffer for transmitting the second record group 213 from the NAND memory 20 to the DRAM 30.

Next, the operation of the memory system 1 will be described. First, a non-volatilization operation of the dirty record will be described. FIG. 12 is a flowchart for describing the non-volatilization operation of the dirty record.

First, the processing unit determines whether a non-volatilization timing has come (S101). In a case where the non-volatilization timing has not come (No in S101), the processing unit performs the determination process of S101 again. The determination on the non-volatilization timing is made by any method. For example, when the amount of dirty records exceeds a predetermined amount, the processing unit determines that the non-volatilization timing has come.

In a case where the non-volatilization timing has come (Yes in S101), the processing unit specifies a non-volatilization target region (S102). The specifying of the non-volatilization target region means that the second record group 316 is specified as a non-volatilization target among the dirty records. For example, when the state of the second record group 316 transitions from a clean state to a dirty state, the processing unit records the region number corresponding to the second record group 316 in chronological order in a dirty list. The processing unit, for example, selects the earliest-recorded region number in the dirty list, and sets the region indicated by the selected region number as the non-volatilization target. Further, the processing unit deletes the region number indicating the non-volatilization target region from the dirty list after the non-volatilization. Hereinafter, in the description of FIG. 12, the non-volatilization target region is denoted as a target region.

Subsequently to the process of S102, the processing unit adds the second record group 316 of the target region to the end of the second table 203 as a new second record group 213 (S103). Then, a pointer recorded in the first record 311 of the target region is overwritten with the pointer which points the new second record group 213 (S104). Further, the second record group 316 of the target region is the second record group 316 which includes the data addresses of all sectors in the target region. In this example, the second record group 316 of the target region includes the region number of the target region as the index and the second record 326 as the second record 326 of the head. In addition, the first record 311 of the target region is the first record 311 which includes the region number of the target region as the index.

Subsequently, the processing unit adds a new reverse-lookup first record 312 which includes the region number of the target region as the data item to the end of the reverse-lookup first table 302 (S105). The index of the new reverse-lookup first record 312 corresponds to a pointer which points the new second record group 213. After the process of S105, the processing unit performs the determination process of S101 again.

Figure 13:
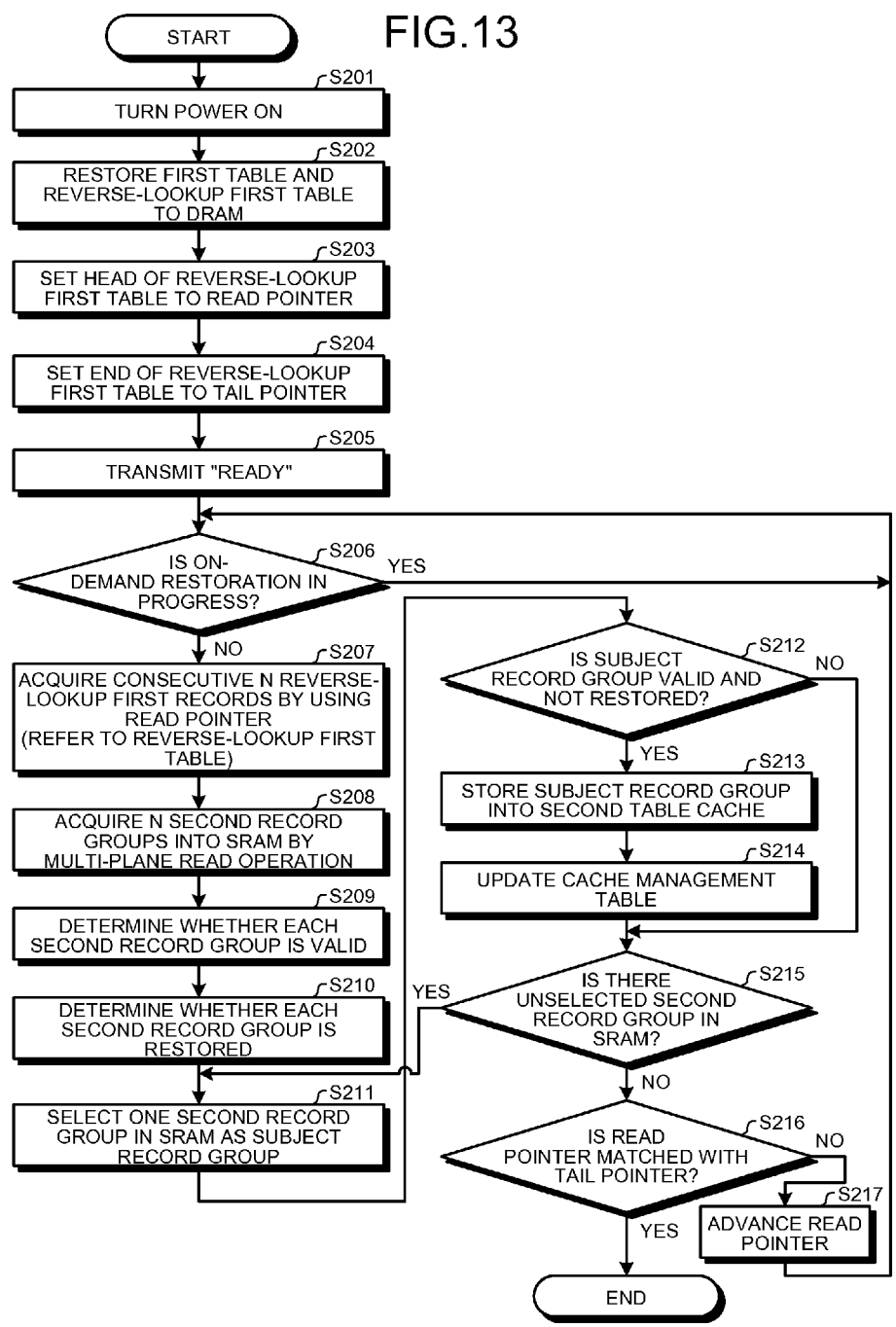
FIG. 13 is a flowchart for describing background restoration of a first embodiment.

FIG. 13 is a flowchart for describing the background restoration. When the memory system 1 transitions from the power-off state to the power-on state (S201), the processing unit restores the first table 201 and the reverse-lookup first table 202 to the DRAM 30 (S202). The processing unit sets the head of the reverse-lookup first table 302 which is the restored reverse-lookup first table 202 to the read pointer 303 (S203). In addition, the processing unit sets the end of the reverse-lookup first table 302 to the tail pointer 304 (S204). Through the process of S203, the processing unit stores the head location of the reverse-lookup first table 302 as the read pointer 303 in the DRAM 30. The read pointer 303 is moved by the process described below. Through the process of S204, the processing unit stores the end location of the reverse-lookup first table 302 as the tail pointer 304 in the DRAM 30. The tail pointer 304 is fixed while the background restoration is in progress. Immediately after the process of S204, the memory system 1 transmits "READY" to the host 2 (S205). "READY" is a notice which means that the memory system 1 can receive an access request from the host 2.

Subsequently, the processing unit determines whether the on-demand restoration is in progress (S206). The on-demand restoration in progress means that the processing unit is performing any one of the processes S402 to S407 described below. In a case where the on-demand restoration is in progress (Yes in S206), the processing unit performs the determination process of S206 again. In a case where the on-demand restoration is not in progress (No in S206), the processing unit acquires N reverse-lookup first records 312, each stored in the consecutive locations, from a location indicated by the read pointer 303 in the reverse-lookup first table 302 (S207). Then, the processing unit reads N second record groups 213 associated with the acquired N reverse-lookup first records 312 from the NAND memory 20 to the SRAM 15 (S208). The processing unit collectively reads the N second record groups 213 in the process of S207 by one multi-plane read operation.

Subsequently, the processing unit determines whether each second record group 213 read to the SRAM 15 is valid (S209). Herein, the validity of the second record group 213 means that the second record group 213 is the latest second record group 213 among one or more second record groups 213 related to the same region stored in the NAND memory 20. In addition, the invalidity of the second record group 213 means that the second record group 213 is not valid. The reason why the determination on the validity of each second record group 213 is necessary is that the plurality of second record groups 213 related to the same region are likely to be included in the second table 203 by a series of processes illustrated in FIG. 12. The valid second record group 213 is pointed by certain one of the first records 311. The invalid second record group 213 is pointed by none of the first records 311.

Figure 14:
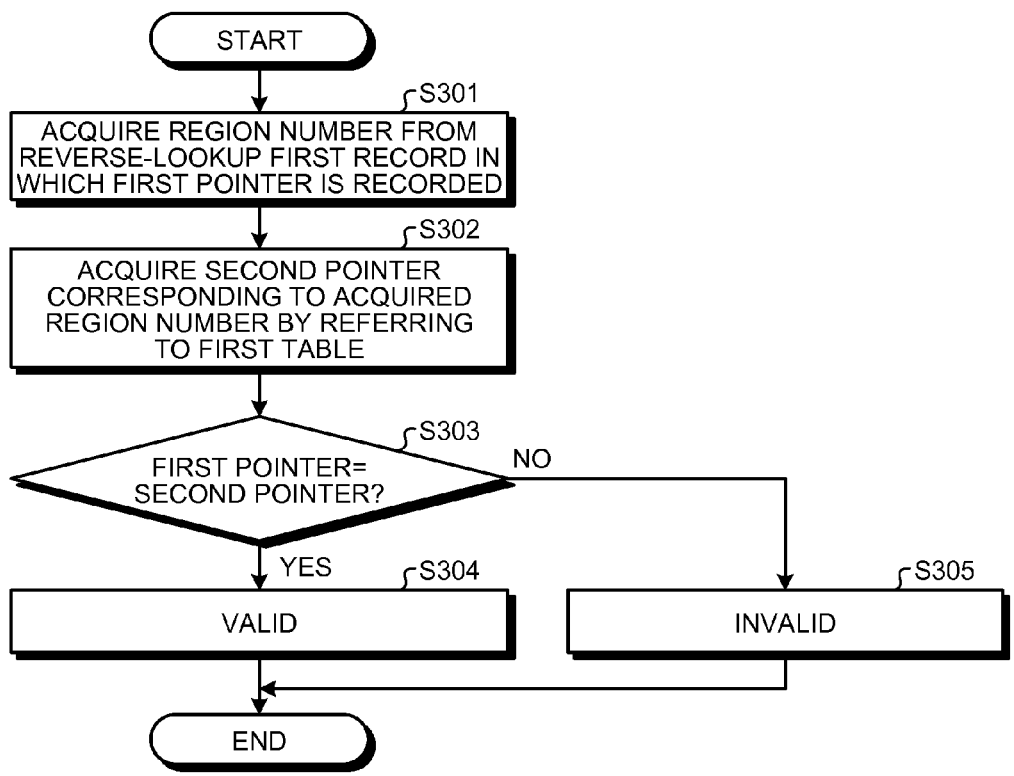
FIG. 14 is a flowchart for describing a process of S209 in more detail.

FIG. 14 is a flowchart for describing the process of S209 in more detail. Herein, a process on one second record group 213 (hereinafter, referred to as a subject record group) will be described. First, the processing unit acquires the region number from the index of the reverse-lookup first record 312 in which a pointer (a first pointer) pointing the subject record group is recorded (S301). Then, the processing unit acquires a pointer (a second pointer) by retrieving the first table 301 using the acquired region number as a retrieval key (S302). Then, the processing unit determines whether the first pointer and the second pointer are matched with each other (S303). In a case where the first pointer and the second pointer are matched with each other (Yes in S303), the processing unit determines that the subject record group is valid (S304), and ends the operation. In a case where the first pointer and the second pointer are not matched with each other (No in S303), the processing unit determines that the subject record group is invalid (S305), and ends the operation.

In the process of S209, the processing unit performs a series of processes described in FIG. 14 on each second record group 213 read out to the SRAM 15.

Subsequently, the processing unit determines whether each second record group 213 read to the SRAM 15 is restored (S210). The processing unit refers the cache management table 305 using the region number acquired in the process of S301 as the retrieval key. Then, in a case where "Cached" is acquired, the processing unit determines that the second record group 213 corresponding to the region number is restored. In a case where "Not Cached" is acquired, the processing unit determines that the second record group 213 corresponding to the region number is not restored.

Subsequently, the processing unit selects one second record group 213 among the N second record groups 213 read to the SRAM 15 (S211). In the description of FIG. 14, the second record group 213 selected through the process of S211 is denoted as a subject record group. The processing unit determines whether the subject record group is valid and not restored (S212). In a case where the subject record group is valid and not restored (Yes in S212), the subject record group is stored into the second table cache 306 (S213). In other words, the processing unit restores the subject record group to the second table cache 306. Subsequently, the processing unit updates the cache management table 305 (S214). Specifically, the processing unit sets "Cached" to the region of the subject record group in the cache management table 305. In a case where the subject record group is valid or restored (No in S212), the processing unit skips the processes of S213 and S214.

Subsequently, the processing unit determines whether there is an unselected second record group 213 among the N second record groups 213 read to the SRAM 15 (S215). In a case where there is an unselected second record group 213 (Yes in S215), the processing unit performs the process of S211 on the unselected second record group 213 again.

In a case where all the N second record groups 213 read to the SRAM 15 had been selected (No in S215), the processing unit determines whether the read pointer 303 and the tail pointer 304 are matched with each other (S216). In a case where the read pointer 303 and the tail pointer 304 are not matched with each other (No in S216), the processing unit advances the read pointer 303 (S216). Specifically, the processing unit updates the value of the read pointer 303 with a value obtained by adding the size of the N reverse-lookup first records 312 to the current value. After the process of S216, the processing unit performs the determination of S206 again.

In a case where the read pointer 303 and the tail pointer 304 are matched with each other (Yes in S216), the processing unit ends the background restoration.

Figure 15:
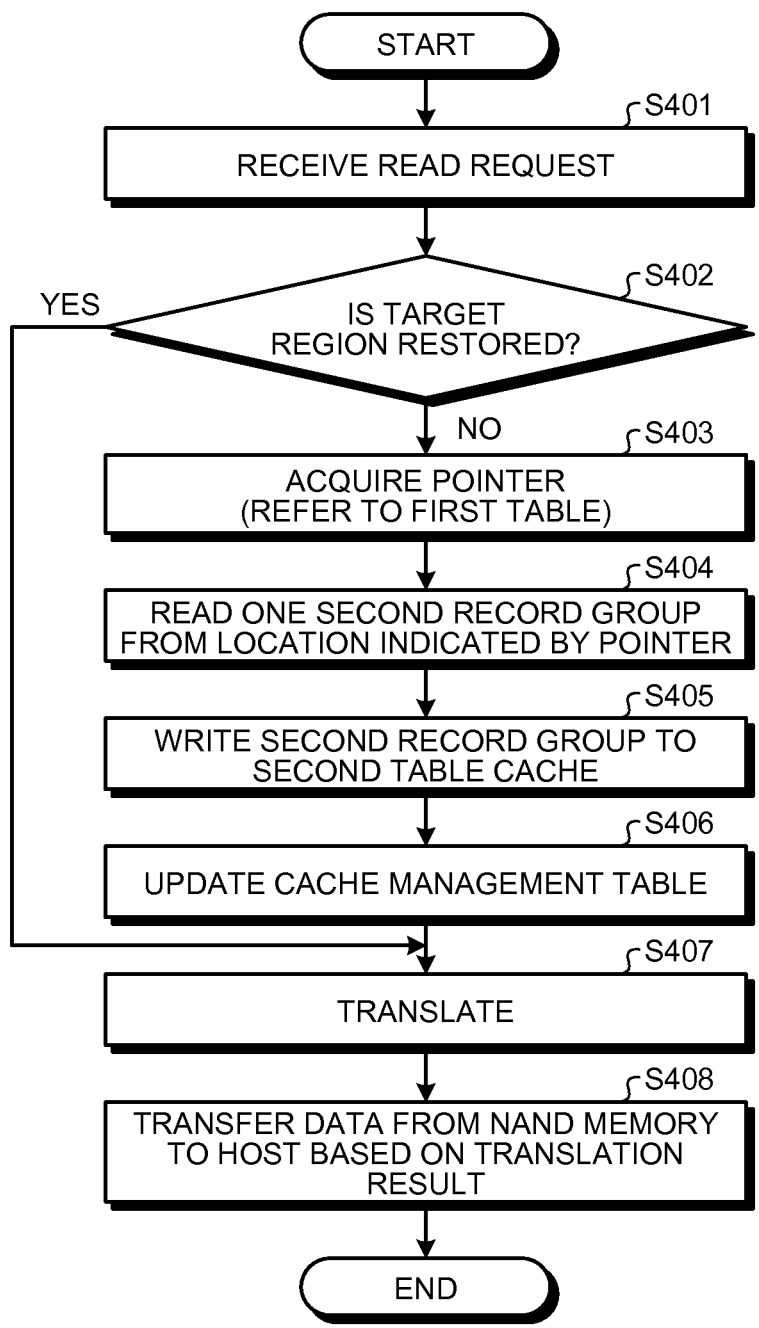
FIG. 15 is a flowchart for describing on-demand restoration.

FIG. 15 is a flowchart for describing the on-demand restoration. Herein, as an example, a case where the read request is received will be described. More specifically, the on-demand restoration means the processes from S402 to S407 described below. The processes from S402 to S407 can be executed in other operation (for example, write operation).

When the memory system 1 receives the read request from the host 2 (S401), the processing unit determines whether the target region is restored with reference to the cache management table 305 (S402). Further, in the description of FIG. 15, the region including the host address designated by the read request is denoted as a target region. In addition, "the target region is restored" means that the target region is cached.

In a case where the target region is not restored (No in S402), the processing unit acquires a pointer by referring the first table 301 using the region number of the target region as the retrieval key (S403). The processing unit reads one second record group 213 from a location indicated by the pointer in the NAND memory 20 to the SRAM 15 (S404). The processing unit stores the second record group 213 read to the SRAM 15 into the second table cache 306 (S405). The processing unit updates the cache management table 305 according to the process of S405 (S406). Specifically, the processing unit sets "Cached" to a record having the region number of the target region as its index.

Further, the processing unit may perform the multi-plane read operation in the process of S404. Through the multi-plane read operation, the processing unit reads the N second record groups 213 from four pages including the location indicated by the pointer acquired in the process of S403 to the SRAM 15. Then, the processing unit performs the processes of S209 to S215 on the N second record groups 213 read to the SRAM 15.

In addition, the processing unit may read the N second record groups 213 to each page buffer 22 by the multi-plane read operation. After reading the N second record groups 213 to each page buffer 22, the processing unit may read only one second record group 213 related to the target region from the NAND memory 20 to the SRAM 15 by the output command. In addition, the processing unit may specify one or more second record groups 213 which are valid and not restored among the N second record groups 213 read to each page buffer 22, and read only one or more second record groups 213 which are valid and not restored to the SRAM 15 by the output command.

In a case where the target region is restored (Yes in S402) or after the process of S406, the processing unit translates the host address designated by the read request into the data address by referring the second table cache 306 (S407). Then, the processing unit performs data transmission from the NAND memory 20 to the host 2 based on the translation result (S408), and ends the on-demand restoration.

In this way, according to the first embodiment, the processing unit reads each second record group 213 stored in the NAND memory 20 in an order according to the storage location in the NAND memory 20 in a case of starting, and restores the second record group 213 to the second table cache 306. Therefore, since the processing unit is enabled to collectively read the plurality of second record groups 213 of which the storage locations are consecutive from the memory cell array 23, the background restoration is improved in speed compared to a case where each second record group 213 is read in serial from the memory cell array 23. Further, the processing unit performs the background restoration in a case of starting. The memory system 1 transmits "READY" to the host 2 in response to the completion of restoring the first table 201 and rebuilding the reverse-lookup first table 302. After transmitting "READY", the memory system 1 can accept the access request from the host 2. The time of start-up means a period of time taken until at least the power-on sequence is ended after power is supplied to the memory system 1.

Further, the description herein will be made on an assumption that the physical address is assigned to each page to make the collective reading of the N second record groups 213 enabled through the multi-plane read operation. A method of assigning the physical address is not limited to the above method. In this case, the processing unit may calculate the storage locations of the plurality of the second record groups 213 which are collectively read and have the consecutive storage locations. Having the consecutive storage locations means a positional relation between two second record groups 213 to make the collective reading of two second record groups 213 enabled. Further, a collectively reading method is not limited only to the multi-plane read operation. For example, the processing unit may collectively read two or more second record groups 213 stored in one plane 24 to the page buffer 22 (single plane read). That is, the read unit size may be the number of second record groups 213 stored in one plane 24.

In addition, the processing unit manages the reverse-lookup first table 302. The reverse-lookup first table 302 includes a plurality of reverse-lookup first records 312. Each reverse-lookup first record 312 shows a relation between a pointer pointing a certain second record group 213 and a host address. Each reverse-lookup first record 312 is recorded in the reverse-lookup first table 302 in an order of the pointer recorded in each reverse-lookup first record 312. The processing unit reads each second record group 213 based on the order of the recording location of each reverse-lookup first record 312. Therefore, the processing unit can simply manage the reading of each second record group 213.

Further, the above-mentioned description has been made about the background restoration in which the processing unit transfers the N second record groups 213 from the NAND memory 20 to the SRAM 15. The processing unit reads the N second record groups 213 from the memory cell array 23 to the respective page buffers 22 by the multi-plane read operation. Then, the processing unit may be configured to acquire a valid second record group 213 from each page buffer 22, and not acquire an invalid second record group 213 from each page buffer 22. In addition, the processing unit may be configured to acquire the second record group 213 which is valid and not restored from each page buffer 22, and not acquire the second record group 213 which is invalid or restored from each page buffer 22.

In addition, the processing unit performs the on-demand restoration. In the on-demand restoration, the processing unit determines whether the region including the host address of a translation target is already restored based on the cache management table 305. In a case where the restoration is not completed, the processing unit restores the second record group 213 related to the region including the host address of the translation target from the NAND memory 20 to the second table cache 306. Therefore, it is prevented that a cache content related to the region including the host address of the translation target is overwritten with the content stored in the NAND memory 20.

In addition, the processing unit performs the on-demand restoration according to the occurrence of the translation request, and suspends the background restoration in a case where the on-demand restoration is in progress. After the on-demand restoration is completed, the processing unit resumes the background restoration. That is, the processing unit performs the on-demand restoration with priority higher than that of the background restoration. Therefore, the processing unit can transmit a response to the read request from the host 2 more speedy compared to a case where the on-demand restoration is not performed with priority higher than that of the background restoration. In addition, before the background restoration is completed, the processing unit can receive the read request from the host 2 to perform a process corresponding to the access request (the read request or the write request) or a process of the garbage collection.

Second Embodiment

The processing unit of a second embodiment does not save the reverse-lookup first table 302 in the NAND memory 20 in the power-off sequence. The processing unit rebuilds the reverse-lookup first table 302 based on the first table 301 in the power-on sequence.

Figure 16:
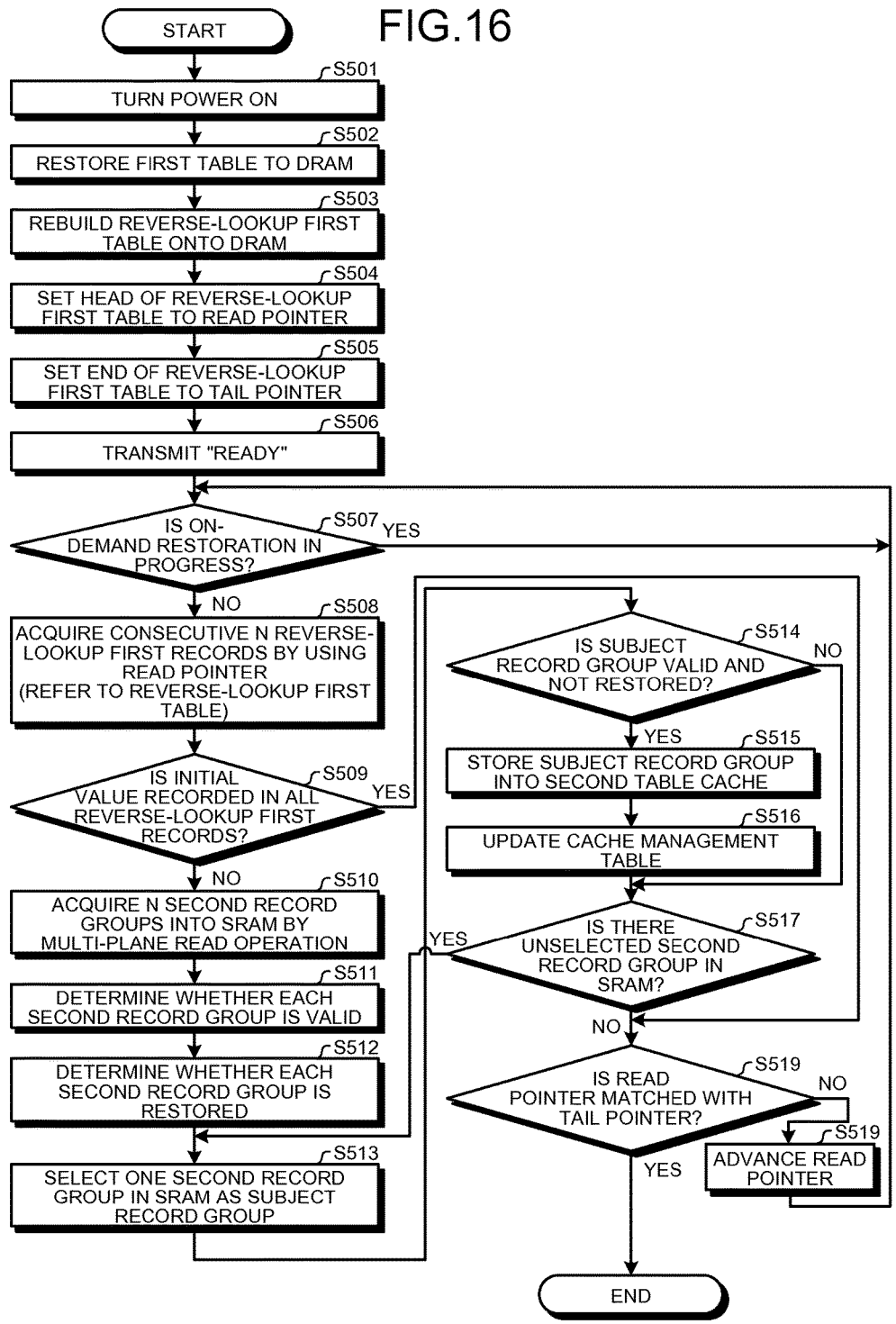
FIG. 16 is a flowchart for describing background restoration of a second embodiment.
Figure 17:
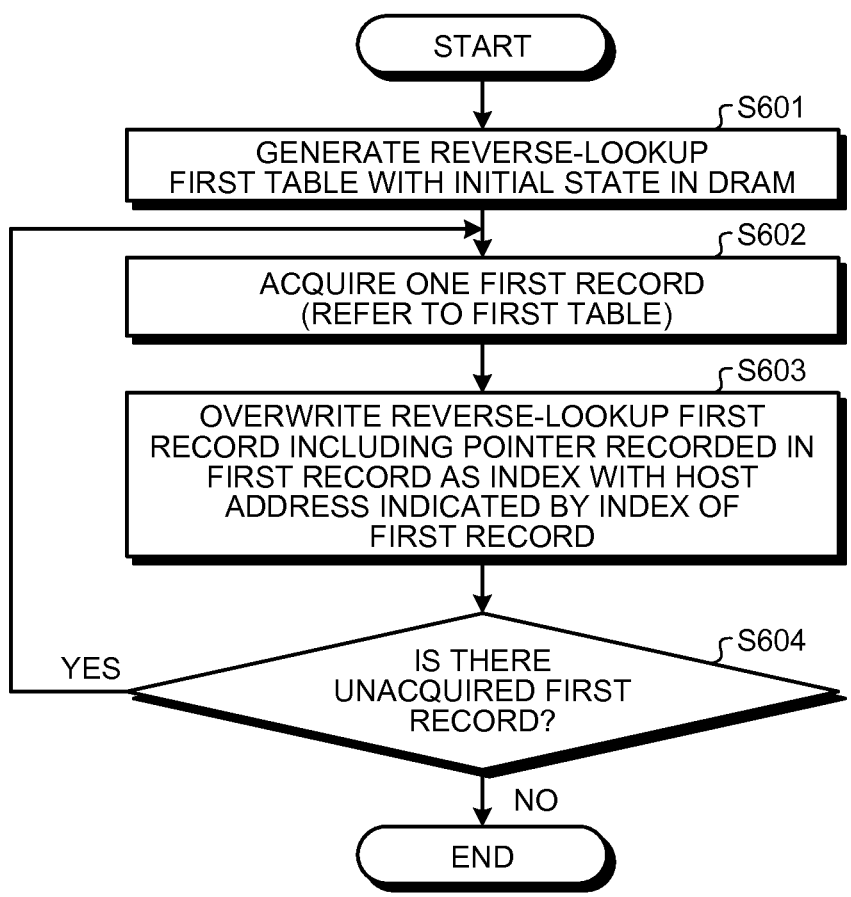
FIG. 17 is a flowchart for describing a process of rebuilding the reverse-lookup first table.

FIG. 16 is a flowchart for describing the background restoration of the second embodiment. When the memory system 1 transitions from the power-off state to the power-on state (S501), FIG. 17 is a flowchart for describing a process of rebuilding the reverse-lookup first table 302. The processing unit generates the reverse-lookup first table 302 in an initial state (S601). The initial state means a state in which an initial value is recorded in the data item of each reverse-lookup first record 312. The initial value is a magic number which does not indicate any location in NAND memory 20. Further, the number of records of the reverse-lookup first table 302 in the initial state, for example, is equal to the number of second record groups 213 included in the second table 203 at the time immediately after the process of S501 (that is, a time after the start-up is made but the non-volatilization is not performed even once).

The processing unit acquires one first record 311 from the first table 301 (S602). Then, the processing unit overwrites a reverse-lookup first record 312 with a host address (S603). In the process of S603, the reverse-lookup first record 312 means the reverse-lookup first record 312 includes the pointer recorded in the acquired first record 311 as the index. In the process of S603, the host address means the host address indicating the index of the first record 311 acquired by the process of S602. Then, the processing unit determines whether there is an unacquired first record 311 in the first table 301 (S604). In a case where there is still an unacquired first record 311 in the first table 302 (Yes in S604), the processing unit performs the process of S602 again. In the process of S602, the processing unit acquires one first record 311 among one or more first records 311 which are still not acquired. In a case where there is no unacquired first record 311 in the first table 301 (No in S604), the processing unit completes a process of rebuilding the reverse-lookup first table 302.

In the reverse-lookup first table 302 which is rebuilt by a series of the processes described in FIG. 17, the state of each reverse-lookup first table 302 is a state where the initial value is recorded or a state where the region number is recorded.

After the process of S503, the processing unit sets the head of the reverse-lookup first table 302 to the read pointer 303 (S504). The processing unit sets the end of the reverse-lookup first table 302 to the tail pointer 304 (S505). Immediately after the process of S505, the memory system 1 transmits "READY" to the host 2 (S506). The processing unit determines whether the on-demand restoration is in progress (S507). In a case where the on-demand restoration is in progress (Yes in S507), the processing unit performs the determination process of S507 again. In a case where the on-demand restoration is not in progress (No in S507), the processing unit acquires the N reverse-lookup first records 312 of which the storage locations are consecutive from the location indicated by the read pointer 303 in the reverse-lookup first table 302 (S508).

Subsequently, the processing unit determines whether the initial value is recorded in all the acquired N reverse-lookup first records 312 (S509). In a case where the region number is recorded in at least one of the acquired N reverse-lookup first records 312 (No in S509), the processing unit performs the same processes as those of S208 to S215 (S510 to S517). In a case where the initial value is recorded in all the acquired N reverse-lookup first records 312 (Yes in S509), or in a case where all the N second record groups 213 read to the SRAM 15 had been selected (No in S517), the processing unit determines whether the read pointer 303 and the tail pointer 304 are matched with each other (S518). In a case where the read pointer 303 and the tail pointer 304 are not matched with each other (No in S518), the processing unit advances the read pointer 303 (S519).

After the process of S519, the processing unit performs the determination process of S507 again. In a case where the read pointer 303 and the tail pointer 304 are matched with each other (Yes in S518), the processing unit ends the background restoration.

In this way, according to the second embodiment, the processing unit restores the reverse-lookup first table 302 based on the first table 301 in a case of starting. Therefore, the processing unit can omit processing of the saving the reverse-lookup first table 302 in the power-off sequence.

Further, the host 2 may notify a forenotice of the power-off to the memory system 1 before the power-off. The processing unit starts the power-off sequence when the forenotice is received. On the other hand, the power-off may be performed without the forenotice. The memory system 1 is mounted with a battery for performing the power-off sequence even in a case where the power-off is performed without the forenotice. According to the second embodiment, since the reverse-lookup first table 302 is not a saving target, the power charged in the battery can be efficiently used compared to a case where the reverse-lookup first table 302 is saved.

In addition, the processing unit first records the initial value to all the reverse-lookup first records 312. Then, the processing unit records the region number in the reverse-lookup first record 312 using the pointer indicating the relation in one of the first records 311 as an index.

In addition, in a case where the initial value is recorded in the reverse-lookup first record 312, the state of the second record group 213 pointed by the pointer indicated by the index of the reverse-lookup first record 312 is the invalid state. In a case where the initial value is recorded in all the N reverse-lookup first records 312 corresponding to the N second record groups 213 capable of being collectively read by the multi-plane read operation in a background restoration, the processing unit skips the reading of the N second record groups 213 from the NAND memory 20. Therefore, the processing unit can omit a useless access to the NAND memory 20.

Further, the processing unit may acquire the N second record groups 213 into the SRAM 15 even in a case where the initial value is recorded in the reverse-lookup first records 312 corresponding to all the N second record groups 213 in the background restoration.

Third Embodiment

In a third embodiment, the processing unit does not save the first table 301 in the power-off sequence. The processing unit rebuilds the first table 301 in the power-on sequence.

Specifically, after the process of S103 in FIG. 12, the processing unit stores a pair of the region number of the target region and the pointer pointed to a new second record group 213 added to the end of the second table 203 in the NAND memory 20 as a log. In the power-on sequence, the processing unit reads a series of logs stored in the NAND memory 20 in the order in which the series of logs were stored, and sorts and dedupes the pointers included in the read logs in an order of the region number in the DRAM 30 so as to rebuild the first table 301. In a case where a plurality of pointers corresponding to the same region number are read, the processing unit overwrites a pointer read earlier with a pointer read later.

In this way, the processing unit can configure the memory system 1 without saving the first table 301.

Fourth Embodiment

Figure 18:
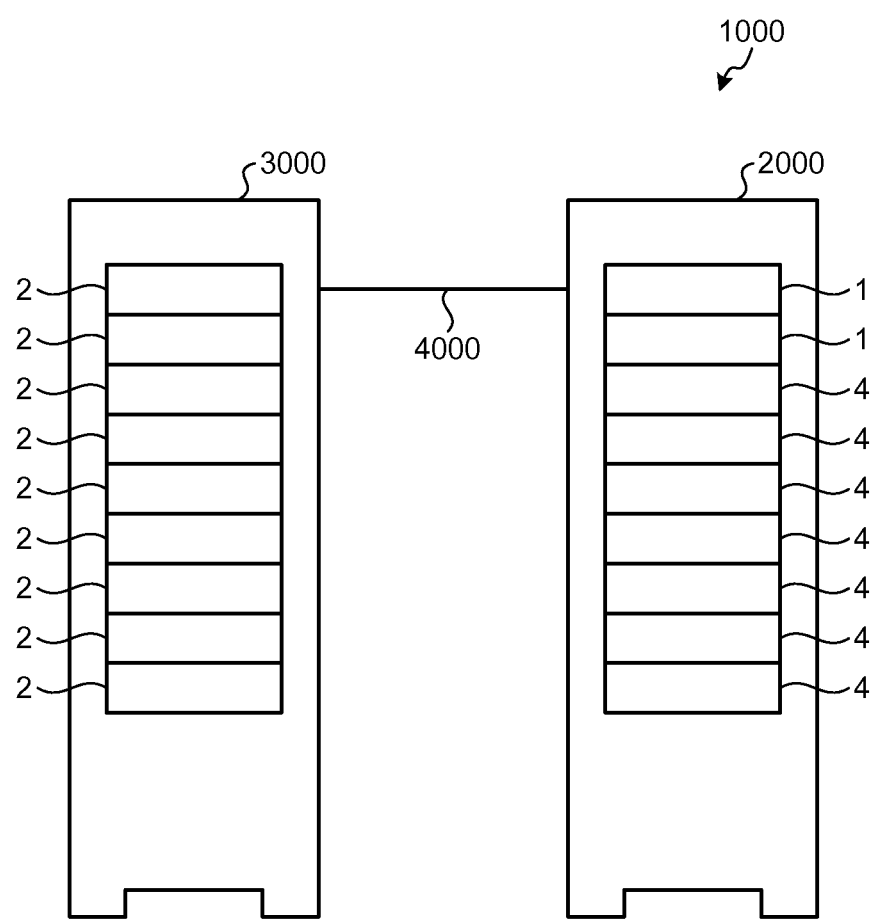
FIG. 18 is a diagram illustrating an example of an installed memory system.

FIG. 18 is a diagram illustrating an example of the installed memory system 1. The memory system 1, for example, is mounted on a server system 1000. The server system 1000 is configured to connect a disk array 2000 and a rack-mount server 3000 through a communication interface 4000. As a standard of the communication interface 4000, any standard can be employed. The rack-mount server 3000 is configured such that one or more hosts 2 are mounted on a server rack. A plurality of hosts 2 can have access to the disk array 2000 through the communication interface 4000.

In addition, the disk array 2000 is configured such that one or more memory systems 1 and one or more hard disk units 4 are mounted on the server rack. Each memory system 1 can perform the read command from each host 2. In addition, each memory system 1 has the configuration employed from any one of the first to third embodiments.

Further, in the disk array 2000, for example, each memory system 1 may be used as the cache of one or more hard disk units 4. The disk array 2000 may be configured such that a storage controller unit for building RAID is mounted on one or more hard disk units 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a non-volatile first memory;
    a second memory; and
    a memory controller configured to store a plurality of translation information in the first memory, the translation information indicating a relation between a first address designated from outside and a second address indicating a location in the first memory, and perform a first process in a case of starting,
    wherein the first process is a process in which the memory controller acquires the plurality of translation information from the first memory in an order of a storage location of the translation information in the first memory, and stores the plurality of acquired translation information in the second memory,
    the memory controller is further configured to
    manage a reverse-lookup information group in which a plurality of reverse-lookup information are arranged in an order of storage location information, the reverse-lookup information indicating a relation between the storage location information and the first address, the storage location information indicating the storage location of the translation information in the first memory, and
    read the plurality of translation information based on the order of the arrangement of the plurality of reverse-lookup information in the first process.

2. The memory system according to claim 1,
    wherein the memory controller is configured to manage lookup information in which the storage location information is retrievable using the first address as a retrieval key, and generate the reverse-lookup information group based on the lookup information in the case of starting.

3. The memory system according to claim 2,
    wherein the memory controller is configured to
    initialize the reverse-lookup information, the initialization being to associate an initial value with the storage location information,
    acquire the storage location information from the lookup information using the first address as the retrieval key, and
    overwrite the initial value associated to the acquired storage location information by the reverse-lookup information with the first address used as the retrieval key.

4. The memory system according to claim 3,
    wherein the memory controller is configured to
    store first translation information in the second memory and not store second translation information in the second memory,
    the first translation information is translation information, the first address being associated with the storage location information indicating the storage location of the translation information by the reverse-lookup information group, and
    the second translation information is translation information, the initial value being associated with the storage location information indicating the storage location of the translation information by the reverse-lookup information group.

5. The memory system according to claim 3,
    wherein the memory controller is configured to
    acquire the plurality of translation information through a buffer, and
    read a given number of translation information collectively to the buffer in a case where at least one of the given number of translation information among the plurality of translation information is first translation information,
    the first translation information is translation information, the first address being associated with the storage location information indicating the storage location of the translation information by the reverse-lookup information group.

6. The memory system according to claim 5,
    wherein the memory controller is configured to
    skip reading of the given number of translation information to the buffer in a case where all of the given number of translation information are second translation information,
    the second translation information is translation information, the initial value being associated with the storage location information indicating the storage location of the translation information by the reverse-lookup information group.

7. The memory system according to claim 5,
    wherein the buffer is included in the first memory.

8. The memory system according to claim 1,
    wherein the memory controller is configured,
    when the translation information is added to the first memory, to add the reverse-lookup information corresponding to the added first information to the reverse-lookup information group.

9. The memory system according to claim 8,
    wherein the memory controller is configured to
    manage lookup information in which the storage location information is retrievable from the first address and update the lookup information in response to adding of the translation information to the first memory, and
    determine whether the translation information is invalid information in the first process and not store the translation information determined as the invalid information in the second memory, wherein
    the invalid information is translation information, and
    the storage location in the first memory of the translation information is not matched with the storage location indicated by the storage location information retrieved from the lookup information using the first address of the translation information as a retrieval key.

10. The memory system according to claim 8, further comprising:
    a buffer,
    wherein the memory controller is configured to manage lookup information in which the storage location information is retrievable from the first address and update the lookup information in response to adding of the translation information to the first memory, and collectively read a given number of translation information of which the storage locations are consecutive among the plurality of translation information from the first memory to the buffer in the first process, determine whether the given number of translation information read to the buffer are invalid information or valid information, not store the translation information determined as the invalid information from the buffer to the second memory, and store the translation information at least determined as the valid information from the buffer to the second memory, the invalid information is translation information, the storage location in the first memory of the translation information being not matched with the storage location indicated by the storage location information retrieved from the lookup information using the first address of the translation information as a retrieval key, the valid information is translation information, the storage location in the first memory of the translation information being matched with the storage location indicated by the storage location information retrieved from the lookup information using the first address of the translation information as a retrieval key.

11. The memory system according to claim 10,
wherein the buffer is included in the first memory or the memory controller.

12. The memory system according to claim 1,
wherein the memory controller is configured to perform a second process in response to a translation request for designating a first address of a translation target, the second process is a process in which the memory controller determines whether first translation information is already stored in the second memory, and stores the first translation information in the second memory in a case where the first translation information is not stored in the second memory, and the first translation information is translation information indicating a relation related to the first address of the translation target.

13. The memory system according to claim 12,
wherein the memory controller is configured to
suspend the first process in response to the translation request and start the second process, and
resume the first process after the second process is ended.

14. The memory system according to claim 13,
wherein the memory controller is configured to, in the first process,
determine whether the translation information is already stored in the second memory, and not store the translation information in the second memory in a case where the translation information is determined as being already stored in the second memory.

15. The memory system according to claim 12, further comprising:
a buffer,
wherein the memory controller is configured to
include the first translation information, specify a given number of translation information of which the storage locations are consecutive, and collectively read the given number of translation information from the first memory to the buffer, and
determine whether the given number of translation information stored in the buffer are already stored in the second memory, not store the translation information determined as being already stored in the second memory among the given number of translation information stored in the buffer in the second memory, and store, in the second memory, the translation information at least determined as information not stored in the second memory among the given number of translation information stored in the buffer.

16. The memory system according to claim 15,
wherein the buffer is included in the first memory or the memory controller.

17. The memory system according to claim 12,
wherein the memory controller is configured to
add the translation information to the end of the plurality of translation information stored in the first memory, and
set the plurality of translation information stored in the first memory in the case of starting as a target of the first process.

18. The memory system according to claim 12,
wherein the memory controller is configured to issue the translation request in response to a read request from the outside.

19. The memory system according to claim 1,
wherein the memory controller is configured to arrange the plurality of acquired translation information in the second memory in an order of the first address.

20. The memory system according to claim 1,
wherein the memory controller receives an access request from the outside before the memory controller completely stores the plurality of translation information in the second memory, the memory controller suspends the first process in response to the access request and starts a second process and resumes the first process after the second process is ended, the second process is a process to store first translation information in the second memory, the first translation information is translation information indicating a relation related to a first address designated by the access request, and the memory controller, in the first process, stores second translation information in the second memory, the second translation information is translation information having not been stored in the second memory yet by the second process.

21. A memory system comprising:
a non-volatile first memory configured to store a plurality of translation information, the translation information being information indicating a relation between a first address designated from outside and a second address indicating a location of the first memory; and
a second memory in which the plurality of translation information is to be cached,
wherein
the memory system performs a first process in a case of starting, the first process is a process to cache the plurality of translation information from the first memory to the second memory,
in a case where the memory system receives an access request from the outside before the memory system completely caches the plurality of translation information, the memory system suspends the first process in response to the access request and starts a second process and resumes the first process after the second process is ended,
the second process is a process to cache first translation information in the second memory, the first translation information is translation information indicating a relation related to a first address designated by the access request, and the memory system, in the first process, caches second translation information in the second memory, the second translation information is translation information having not been cached in the second memory yet by the second process.

* * * * *